United States Patent
Walters et al.

(10) Patent No.: US 7,126,237 B2
(45) Date of Patent: Oct. 24, 2006

(54) MOW-IN REVERSE CONTROL

(75) Inventors: Tracey Walters, Bowman, SC (US); Scott Kendall, West Columbia, SC (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 440 days.

(21) Appl. No.: 10/702,851

(22) Filed: Nov. 6, 2003

(65) Prior Publication Data
US 2004/0124026 A1 Jul. 1, 2004

Related U.S. Application Data

(60) Provisional application No. 60/319,673, filed on Nov. 6, 2002.

(51) Int. Cl.
B60L 3/00 (2006.01)
(52) U.S. Cl. ........................................ 307/9.1
(58) Field of Classification Search ............. 307/9.1
See application file for complete search history.

(56) References Cited

U.S. PATENT DOCUMENTS

| | | |
|---|---|---|
| 3,726,265 A | 4/1973 | Howard |
| 3,736,729 A | 6/1973 | Peterson |
| 3,808,914 A | 5/1974 | Hauser |
| 3,869,014 A | 3/1975 | Federspiel et al. |
| 3,942,604 A | 3/1976 | Black, III |
| 3,984,967 A | 10/1976 | Jones |
| 3,999,643 A | 12/1976 | Jones |
| 4,062,135 A | 12/1977 | Dobberpuhl |
| 4,178,741 A | 12/1979 | Lonn et al. |
| 4,181,206 A | 1/1980 | Seilenbinder |
| 4,195,466 A | 4/1980 | Heismann |
| 4,236,494 A | 12/1980 | Fairchild |
| 4,294,327 A | 10/1981 | Howard |
| 4,433,530 A | 2/1984 | Schaefer |
| 5,085,043 A | 2/1992 | Hess et al. |
| 5,190,019 A | 3/1993 | Harvey |
| 5,203,440 A | 4/1993 | Peterson, Jr. et al. |
| 5,314,038 A | 5/1994 | Peterson, Jr. |
| 5,335,487 A | 8/1994 | Murakawa et al. |
| 5,445,575 A | 8/1995 | Sundeen |
| 5,497,604 A | 3/1996 | Lonn |
| 5,581,985 A | 12/1996 | Secosky |
| 5,601,512 A | 2/1997 | Scag |
| 5,645,135 A | 7/1997 | Peterson, Jr. |
| 5,934,051 A | 8/1999 | Hahn |
| 5,994,857 A | 11/1999 | Peterson, Jr. et al. |
| 6,109,010 A | 8/2000 | Heal et al. |
| 6,405,513 B1 | 6/2002 | Hancock et al. |
| 6,437,458 B1 | 8/2002 | Baggett |

Primary Examiner—Robert L. Deberadinis
Assistant Examiner—Dru Parries
(74) Attorney, Agent, or Firm—Pearne & Gordon LLP

(57) ABSTRACT

A control arrangement for a lawn mower that selectively prevents operation of the lawn mower in the reverse direction with the lawn mowing mechanism operating. The arrangement includes structure (e.g., a bypass switch) actuatable by a lawn mower operator to permit the operation of the lawn mowing mechanism while the mower is propelled in the reverse direction as a bypass mode. Circuitry interacts with engine operation circuit to cause the operation circuit to selectively terminate operation of the engine when the lawn mowing mechanism is operating, as indicated by a lawn mowing mechanism switch, and the motive drive arrangement is selected to propel the lawn mower in a reverse direction, as indicated by a motive drive arrangement switch, except when the bypass mode is established. The circuitry also terminates the bypass mode when the lawn mower operator is absent as indicated by a operator present switch.

14 Claims, 2 Drawing Sheets

MOW-IN REVERSE CONTROL

RELATED APPLICATION

The present application claims benefit of previously filed Provisional Patent Application Ser. No. 60/319,673 filed Nov. 6, 2002, the disclosure of which is incorporated herein by reference.

FIELD OF THE INVENTION

The present invention relates to a control arrangement for a lawn mower, and specifically related to a control arrangement that controls engine operation when a lawn mowing mechanism is operating and the lawn mower is to be operated in a reverse direction.

BACKGROUND OF THE INVENTION

Lawn mowers are machines for cutting vegetation, such as grass. Often, lawn mowers are referred to as turf mowers. In general, an operator is in close proximity to the lawn mower to control operation of the lawn mower. In one example type, the lawn mower includes a seat upon which the operator rides during operation. However, there are various other lawn mower types in which the operator is in close proximity to the lawn mower to control operation of the lawn mower.

For the lawn mowers, the ability to perform a mowing action while the lawn mower is operated in a reverse direction has certain benefit. However, there may be some circumstances in which performance of the mowing action while the lawn mower is operated in the reverse direction is not wanted.

SUMMARY OF THE INVENTION

In accordance with one aspect, the present invention provides a control arrangement for a lawn mower that has an engine with an associated operation circuit, a motive drive arrangement operatively connected to the engine for selectively propelling the lawn mower in a forward direction and a reverse direction, and an operable lawn mowing mechanism operatively connected to the engine for cutting vegetation. The control arrangement selectively prevents operation of the lawn mower in the reverse direction with the lawn mowing mechanism operating. The control arrangement includes means for sensing operation of the lawn mowing mechanism, and means for sensing selection of the motive drive arrangement to propel the lawn mower in the reverse direction. The control arrangement includes means for receiving a bypass input from a lawn mower operator indicative of the desire to operate the lawn mowing mechanism while the mower is propelled in the reverse direction as a bypass mode. The control arrangement includes means for sensing presence of the lawn mower operator within an operation position with regard to the lawn mower.

The control arrangement includes means for interacting with the engine operation circuit to cause the operation circuit to selectively terminate operation of the engine, the means for interacting being responsive to the means for sensing operation, the means for sensing selection, and the means for receiving such that the operation of the engine is terminated when the lawn mowing mechanism is operating and the motive drive arrangement is selected to propel the lawn mower in reverse except when the bypass mode is established via the means for receiving. The means for interacting includes means for terminating the bypass mode responsive to the means for sensing presence indicating absence of the lawn mower operator.

In accordance with another aspect, the present invention provides a control arrangement for a lawn mower having an engine with an associated operation circuit, a motive drive arrangement operatively connected to the engine for selectively propelling the lawn mower in a forward direction and a reverse direction, and an operable lawn mowing mechanism operatively connected to the engine for cutting vegetation. The control arrangement selectively prevents operation of the lawn mower in the reverse direction with the lawn mowing mechanism operating. The control arrangement includes a lawn mowing mechanism switch that operates in response to the lawn mowing mechanism, and a motive drive arrangement switch that operates in response to selection of the motive drive arrangement to propel the lawn mower in the reverse direction.

The control arrangement includes a bypass switch actuatable by a lawn mower operator to permit operation of the lawn mowing mechanism while the mower is propelled in the reverse direction as a bypass mode. The control arrangement includes an operator presence switch that operates in response to presence of the lawn mower operator within an operation position with regard to the lawn mower. Circuitry of the control arrangement interacts with the engine operation circuit to cause the operation circuit to selectively terminate operation of the engine. The circuitry is connected to receive input from the lawn mowing mechanism switch, the motive drive arrangement switch, the bypass switch, and the occupant present switch. The circuitry causes termination of the operation of the engine when the lawn mowing mechanism is operating, as indicated by the lawn mowing mechanism switch, and the motive drive arrangement is selected to propel the lawn mower in reverse direction, as indicated by the motive drive arrangement switch, except when the bypass mode is established by the bypass switch. The circuitry also terminates the bypass mode when the lawn mower operator is absent as indicated by the operator present switch.

BRIEF DESCRIPTION OF THE DRAWINGS

The foregoing and other features and advantages of the present invention will become apparent to those skilled in the art to which the present invention relates upon reading the following description with reference to the accompanying drawings wherein.

DESCRIPTION OF EXAMPLE EMBODIMENTS

Figure 1:
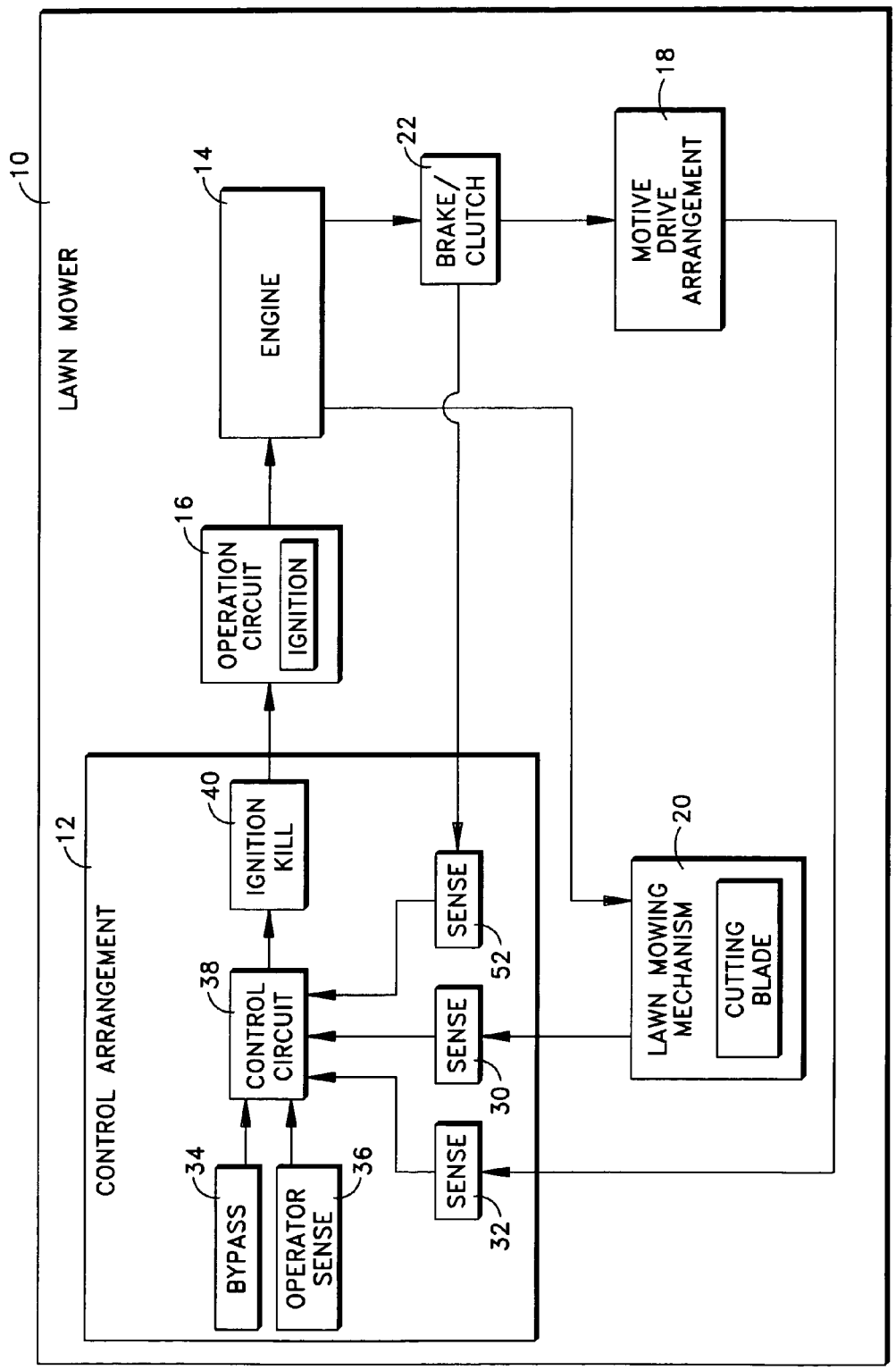
FIG. 1 is a schematic illustration of lawn mower that includes a reverse control arrangement in accordance with the present invention.

A schematic representation of a lawn mower 10 that contains an example of a control arrangement 12, in accordance with the present invention, is shown in FIG. 1. The control arrangement 12 controls an ability of the associated lawn mower 10 to mow in a reverse motion direction. It is to be noted that the schematically-shown associated lawn mower 10 has an engine 14 with an associated operation circuit (e.g., including an ignition coil) 16, a motive drive arrangement (e.g., including a transaxle, ground engaging wheels) 18 operatively connected to the engine 14 for selectively propelling the lawn mower 10 in a forward direction and a reverse direction, and an operable lawn mowing mechanism (e.g., including a cutting blade) 20 operatively connected to the engine for cutting vegetation. Also, the lawn mower 10 may include brake and clutch mechanisms 22, and the mechamisms may be integrated into the operative connection between the engine 14 and the motive drive arrangement 18. The lawn mower 10 is only schematically shown in FIG. 1 and is only an example. It is to be appreciated that particulars and specifics of the lawn mower 10 are not limitations on the present invention.

Turning the control arrangement 12, the arrangement selectively prevents operation of the lawn mower 10 in the reverse direction. In general terms, the control arrangement 12 includes means 30 for sensing operation of the lawn mowing mechanism 20, and means 32 for sensing selection of the motive drive arrangement to propel the lawn mower 10 in the reverse direction. The control arrangement 12 also includes means 34 for receiving a bypass input from a lawn mower operator indicative of the desire to operate the lawn mowing mechanism 20 while the lawn mower 10 is propelled in the reverse direction as a bypass, and means 36 for sensing presence of the lawn mower operator within an operation position with regard to the lawn mower. The lawn mower includes means 38, 40 for interacting with the engine operation circuit 16 to cause the operation circuit to selectively terminate operation of the engine 14. The means 38, 40 for interacting is responsive to the means 30 for sensing operation, the means 32 for sensing selection, and the means 34 for receiving such that the operation of the engine 14 is terminated when the lawn mowing mechanism 20 is operating and the motive drive arrangement 18 is selected to propel the lawn mower 10 in reverse except when overridden via the means 34 for receiving; the means 38, 40 for interacting including means for terminating the bypass mode responsive to the means for sensing presence indicating absence of the lawn mower operator.

Figure 2:
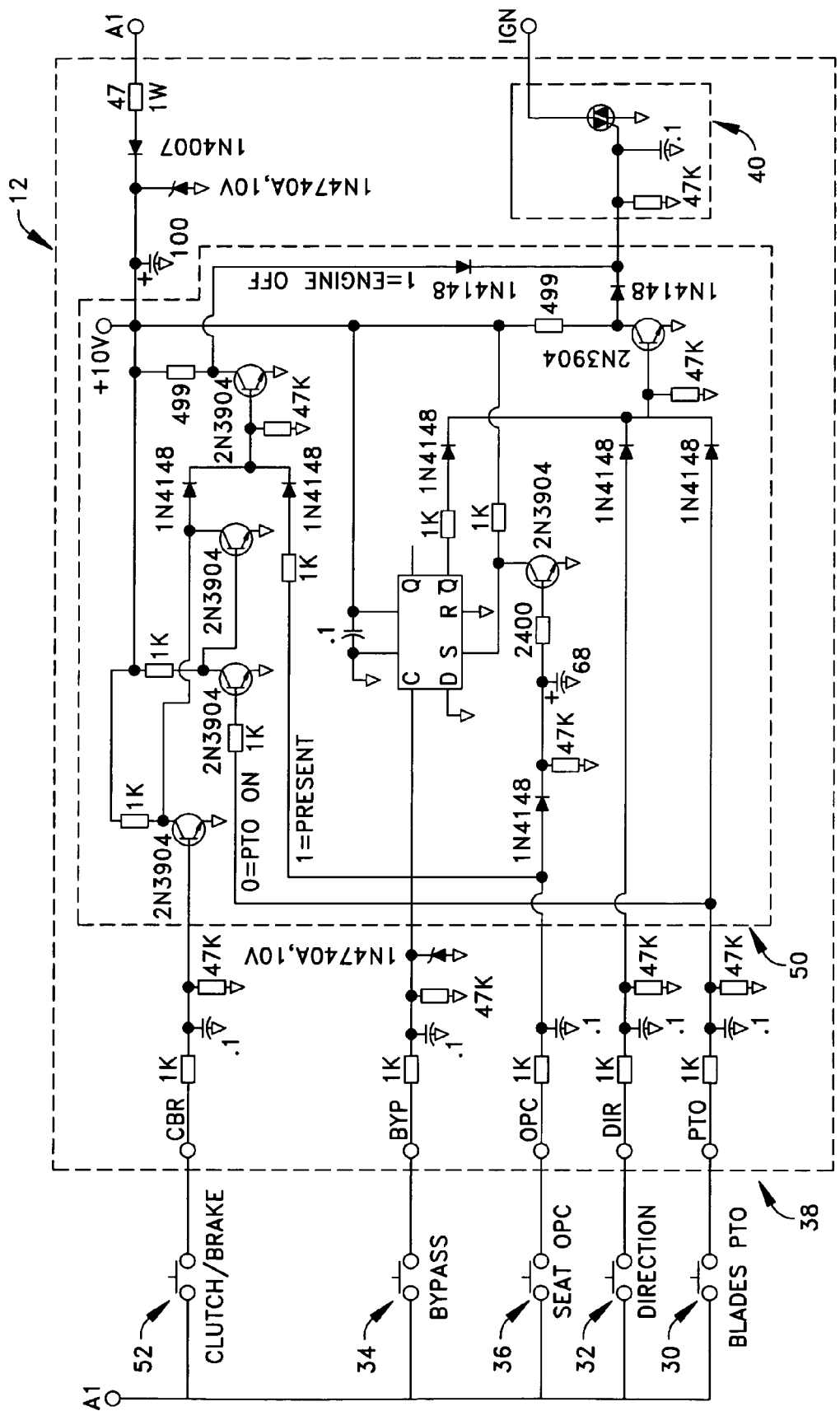
FIG. 2 is a circuit diagram of a first example of the reverse control arrangement of FIG. 1 in accordance with the present invention.

An example of the control arrangement 12 is shown in FIG. 2. The means 38, 40 for interacting is provided in part by a control circuit 38, which in turn includes a controller 50 that performs determinations based upon various inputs. In the shown example, the controller 50 includes an IC chip that is a commercially available product designated MC14013B, which is a dual type flip-flop. The shown example controller 50 also includes transistors, resistors, and capacitors operatively connected as shown and being specific types/having values as indicated in FIG. 2.

In the shown example, the means 30 for sensing operation is provided by a blade switch 30, the means 32 for sensing selection is provided by a direction switch 32, the means 34 for receiving is provided by a bypass switch (e.g., a keyed switch) 34, and the means 36 for sensing is provided by an operator presence control (OPC) switch 36. Also, the shown example includes a clutch/brake switch 52 that provides means to sense operation of the clutch/brake (e.g., clutch/brake engagement). Each of the blade switch 30, the direction switch 32, the bypass switch 34, the OPC switch 36, and the clutch/brake switch 52 is operatively connected to the controller 50. The operative connections of the shown example may include resistors and capacitors as shown and having values as indicated in FIG. 2. The means 38, 40 for interacting includes an ignition kill circuit 40, which is operatively connected to the controller 50. It is to be appreciated that for each of the several means set forth above can be provided by any suitable structure that accomplishes the associated function.

The blade switch 30 is in operative association with the lawn mowing mechanism (e.g., the blade) 20 to provide a "PTO" (e.g., a blade rotation ON status) signal to the controller 50 when the mower blade is in operation. The blade switch 30 causes the mower status signal to change from high (e.g., 12 vdc) to low (e.g., zero vdc) when the lawn mowing mechanism 20 is engaged (e.g., blade rotating to cut vegetation). Alternatively; the lawn mowing mechanism 20 may include a power take off control for engaging and disengaging a mower deck. The blade switch 30 would then take the form of a power take off switch associated with the power take off control. Such a power take off switch would be used in place of or in cooperation with the blade switch 30. Within such a modification, the power take off switch, directly or by way of the blade switch 30, causes the PTO signal to change from high to low when the mower deck is engaged (e.g., to cut vegetation).

The direction switch 32 is in operative association with the motive drive arrangement (e.g., the transaxle) 18 of the lawn mower 10 to provide a direction signal to the controller 50 when the lawn mower is moving in a reverse direction. Within the shown example, the direction switch 32 causes a "DIR" signal to change from high to low when the direction of travel of the lawn mower 10 changes from forward to reverse.

It is to be appreciated that the OPC switch 36 can be any device for sensing operator presence and is associated with the operator location. In the shown example, the OPC switch 36 is in operative association an operator's seat of the lawn mower (e.g., switch change based upon operator presence or absence) to provide an OPC signal to the controller 50 when an operator occupies the seat. The OPC switch 36 causes the OPC signal to change from low to high when the operator occupies the seat.

The clutch/brake switch 52 is in operative association with the mower's brake mechanism to provide a CBR (e.g., clutch/brake) signal to the controller 50 when the brake mechanism is engaged. The CBR signal changes from high to low when the brake is engaged, such as by the operator depressing a parking brake lever. In one example, a parking brake interlock is provided within the lawn mower 10 for controlling the operation of a starter solenoid. For such an example, the clutch/brake switch 52 can be operated by the parking interlock.

The bypass switch 34 is an example of a device by which the operator can input an indication of a desire to operate the lawn mowing mechanism (e.g., the cutting blade) 20 while the mower is propelled in the reverse direction as a bypass mode. Specifically, the example bypass switch 34 is manually operated by the operator to provide a bypass signal to the controller 50 to activate a bypass mode of the control arrangement 12. The actuation of the bypass switch 34 by the operator generates a momentary high (e.g., 12 vdc) pulse from a low. The bypass switch 34 can be, for example, as a pushbutton, a momentary key switch requiring a key to actuate, or the like.

The ignition kill circuit 40 is operated by the control arrangement 12 to shunt the primary side of the ignition coil to ground, thereby shutting the engine 14 off or preventing it from starting. As is discussed below, the operation of the engine 14 is terminated when the lawn mowing mechanism 20 is operating and the motive drive arrangement 18 is selected to propel the lawn mower 10 in reverse except when the bypass mode is established via the bypass switch 34.

With regard to general operation of the lawn mower 10, a starter solenoid of the operation circuit 16 can only be operated if the parking braking is depressed and the mower blade is stopped, wherein the mower deck is disengaged and the blade switch 30 is in the off position. The lawn mowing mechanism 20 can only be operated when the OPC switch 36 indicates that the operator is present. If the operator is not present (i.e., OPC switch 36 senses absence) and the lawn mowing mechanism 20 is engaged (i.e., the blade switch 30 is moved to the on position), the engine is shut down. Also, if the parking brake is in the released position and/or the clutch is engaged, the OPC switch 36 must signal the presence of the operator to achieve forward or reverse travel. If no operator is present and the motive drive arrangement 18 is operated to move the vehicle, the engine will shut down.

As mentioned above, a bypass mode of operation concerning the control arrangement 12 is available. When not in the bypass mode, operation is considered to be in a normal mode. In such a normal mode, when the lawn mowing mechanism 20 is engaged or the PTO operated, the blade switch 30 opens causing a low mower status signal to be sent to the controller 50. If the direction switch 32 indicates that the motive drive arrangement 18 has been shifted to move in reverse, a low direction signal is sent to the controller 50. In response to a simultaneous low mower status signal and low direction signal (i.e., reverse direction), the control arrangement 12 sends a signal to the ignition kill circuit 40 causing it to shut down the engine 14 via the operation circuit 16 (i.e., shunt the ignition coil).

As previously mentioned, when the bypass switch 34 is actuated by the operator, the momentary bypass signal sent to the controller 50 causes the control arrangement 12 to go into bypass mode. Further, the OPC switch 36 must be sending the controller 50 an occupant present signal when the bypass signal is sent to allow the control arrangement 18 to go into bypass mode. While in bypass mode, the controller 50 does not operate the ignition kill circuit 40 in response to a simultaneous "low" mower status signal and "low" direction signal. Thus, while in bypass mode, the mower can operate in a reverse direction with the lawn mowing mechanism 20 operating, allowing the operator to mow in reverse.

Once the operator causes the control arrangement 18 to go into bypass mode, in will remain in bypass mode until a high OPC signal is received by the controller 50 from the OPC switch 36, or until the engine 14 is shut off. Thus, while in bypass mode, the operator may disengage and re-engage the lawn mowing mechanism 20 or PTO switch and change the travel direction of the lawn mower 10 from reverse to forward and forward to reverse, and all the while the control arrangement 18 remains in bypass mode, allowing the operator to mow in reverse. However, once the operator leaves the seat, causing the OPC switch 36 to send a high OPC signal to the controller 50, and after a delay, such as ½ to 1 second, the control arrangement returns to normal mode. The delay prevents brief interruptions in the operator's presence, such as when the lawn mower drives over bumps, to return the control arrangement 18 to normal mode. Further, when, for any reason, the engine is shut off, the control arrangement 18 is reset, such that the control arrangement will be in normal mode when the engine is restarted. Once in normal mode, the operator must again actuate the bypass switch 34 in order to mow in reverse.

The flip-flop IC chip is part of the circuitry that latches until the means OPC switch 36 indicates absence of the lawn mower operator. The flip-flop IC chip also cooperates with the associated components to provide the function of terminating the bypass mode.

It is to be appreciated that the disclosed examples are not intended to be limitations on the present invention, and it is to be appreciated that other embodiments are possible and are intended to be within the scope of the present invention. From the above description of the invention, those skilled in the art will perceive improvements, changes and modifications. Such improvements, changes and modifications within the skill the of the art are intended to be covered by the appended claims.

The invention claimed is:

1. A control arrangement for a lawn mower having an engine with an associated operation circuit, a motive drive arrangement operatively connected to the engine for selectively propelling the lawn mower in a forward direction and a reverse direction, and an operable lawn mowing mechanism operatively connected to the engine for cutting vegetation, the control arrangement selectively preventing operation of the lawn mower in the reverse direction with the lawn mowing mechanism operating, the control arrangement including:

means for sensing operation of the lawn mowing mechanism;

means for sensing selection of the motive drive arrangement to propel the lawn mower in the reverse direction;

means for receiving a bypass input from a lawn mower operator indicative of the desire to operate the lawn mowing mechanism while the mower is propelled in the reverse direction as a bypass mode;

means for sensing presence of the lawn mower operator within an operation position with regard to the lawn mower; and means for interacting with the engine operation circuit to cause the operation circuit to selectively terminate operation of the engine, the means for interacting being responsive to the means for sensing operation, the means for sensing selection, and the means for receiving such that the operation of the engine is terminated when the lawn mowing mechanism is operating and the motive drive arrangement is selected to propel the lawn mower in reverse except when the bypass mode is established via the means for receiving, the means for interacting including means for terminating the bypass mode responsive to the means for sensing presence indicating absence of the lawn mower operator; and the means for interacting includes circuitry that latches until the means for sensing presence indicates absence of the lawn mower operator; and wherein the means for terminating the bypass mode is provided by the circuitry that latches and includes a flip-flop.

2. A control arrangement as set forth in claim 1, wherein the means for interacting maintain the bypass mode when the means for sensing operation of the lawn mowing mechanism detect that a lawn mower operator engages or disengages the lawn mowing mechanism.

3. A control arrangement as set forth in claim 1, wherein the means for receiving includes a switch operable by the lawn mower operator.

4. A control arrangement as set forth in claim 3, wherein the switch of the means for receiving is a momentary ON switch.

5. A control arrangement as set forth in claim 3, wherein the switch of the means for receiving is a keyed switch.

6. A control arrangement as set forth in claim 1, wherein the means for interacting includes means for maintaining the bypass mode once established even if the means for sensing selection no longer senses that the motive drive arrangement is selected to propel the lawn mower in the reverse direction.

7. A control arrangement as set forth in claim 6, wherein the means for interacting includes means for resetting the control arrangement to not be in the bypass mode upon termination of the engine.

8. A control arrangement for a lawn mower having an engine with an associated operation circuit, a motive drive arrangement operatively connected to the engine for selectively propelling the lawn mower in a forward direction and a reverse direction, and an operable lawn mowing mechanism operatively connected to the engine for cutting vegetation, the control arrangement selectively preventing operation of the lawn mower in the reverse direction with the lawn mowing mechanism operating, the control arrangement including:
- a lawn mowing mechanism switch that operates in response to the lawn mowing mechanism;
- a motive drive arrangement switch that operates in response to selection of the motive drive arrangement to propel the lawn mower in the reverse direction;
- a bypass switch actuatable by a lawn mower operator to permit operation of the lawn mowing mechanism while the mower is propelled in the reverse direction as a bypass mode;
- an operator presence switch that operates in response to presence of the lawn mower operator within an operation position with regard to the lawn mower; and
- circuitry that interacts with the engine operation circuit to cause the operation circuit to selectively terminate operation of the engine, the circuitry is connected to receive input from the lawn mowing mechanism switch, the motive drive arrangement switch, the bypass switch, and the occupant present switch, the circuitry causes termination of the operation of the engine when the lawn mowing mechanism is operating, as indicated by the lawn mowing mechanism switch, and the motive drive arrangement is selected to propel the lawn mower in a reverse direction, as indicated by the motive drive arrangement switch, except when the bypass mode is established by the bypass switch, the circuitry also terminates the bypass mode when the lawn mower operator is absent as indicated by the operator present switch; and
- wherein the circuitry includes a component that latches and includes a flip-flop to provide the bypass mode until the occupant present switch indicates absence of the lawn mower operator.

9. A control arrangement as set forth in claim 8, wherein the circuitry maintains the bypass mode when a lawn mower operator engages or disengages the lawn mowing mechanism switch.

10. A control arrangement as set forth in claim 8, wherein the bypass switch is operable by the lawn mower operator.

11. A control arrangement as set forth in claim 10, wherein the bypass switch is a momentary ON switch.

12. A control arrangement as set forth in claim 10, wherein the bypass switch is a keyed switch.

13. A control arrangement for a lawn mower having an engine with an associated operation circuit, a motive drive arrangement operatively connected to the engine for selectively propelling the lawn mower in a forward direction and a reverse direction, and an operable lawn mowing mechanism operatively connected to the engine for cutting vegetation, the control arrangement selectively preventing operation of the lawn mower in the reverse direction with the lawn mowing mechanism operating, the control arrangement including:
- means for sensing operation of the lawn mowing mechanism;
- means for sensing selection of the motive drive arrangement to propel the lawn mower in the reverse direction;
- means for receiving a bypass input from a lawn mower operator indicative of the desire to operate the lawn mowing mechanism while the mower is propelled in the reverse direction as a bypass mode;
- means for sensing presence of the lawn mower operator within an operation position with regard to the lawn mower;
- means for interacting with the engine operation circuit to cause the operation circuit to selectively terminate operation of the engine, the means for interacting being responsive to the means for sensing operation, the means for sensing selection, and the means for receiving such that the operation of the engine is terminated when the lawn mowing mechanism is operating and the motive drive arrangement is selected to propel the lawn mower in reverse except when the bypass mode is established via the means for receiving, the means for interacting including means for terminating the bypass mode responsive to the means for sensing presence indicating absence of the lawn mower operator; and the means for interacting maintain the bypass mode when the means for sensing operation of the lawn mowing mechanism detect that a lawn mower operator engages or disengages the lawn mowing mechanism.

14. A control arrangement for a lawn mower having an engine with an associated operation circuit, a motive drive arrangement operatively connected to the engine for selectively propelling the lawn mower in a forward direction and a reverse direction, and an operable lawn mowing mechanism operatively connected to the engine for cutting vegetation, the control arrangement selectively preventing operation of the lawn mower in the reverse direction with the lawn mowing mechanism operating, the control arrangement including:
- a lawn mowing mechanism switch that operates in response to the lawn mowing mechanism;
- a motive drive arrangement switch that operates in response to selection of the motive drive arrangement to propel the lawn mower in the reverse direction;
- a bypass switch actuatable by a lawn mower operator to permit operation of the lawn mowing mechanism while the mower is propelled in the reverse direction as a bypass mode;
- an operator presence switch that operates in response to presence of the lawn mower operator within an operation position with regard to the lawn mower; and
- circuitry that interacts with the engine operation circuit to cause the operation circuit to selectively terminate operation of the engine, the circuitry is connected to receive input from the lawn mowing mechanism switch, the motive drive arrangement switch, the bypass switch, and the occupant present switch, the circuitry causes termination of the operation of the engine when the lawn mowing mechanism is operating, as indicated by the lawn mowing mechanism switch, and the motive drive arrangement is selected to propel the lawn mower in a reverse direction, as indicated by the motive drive arrangement switch, except when the bypass mode is established by the bypass switch, the circuitry also terminates the bypass mode when the lawn mower operator is absent as indicated by the operator present switch, and the circuitry maintains the bypass mode when a lawn mower operator engages or disengages the lawn mowing mechanism switch.

* * * * *